G. J. LOOS.
CABINET.
APPLICATION FILED JUNE 2, 1920.

1,368,515.

Patented Feb. 15, 1921.

WITNESS
R. H. Schleicher.

INVENTOR:
George J. Loos,
BY Blount, Moulton & Helbut,
ATTORNEYS.

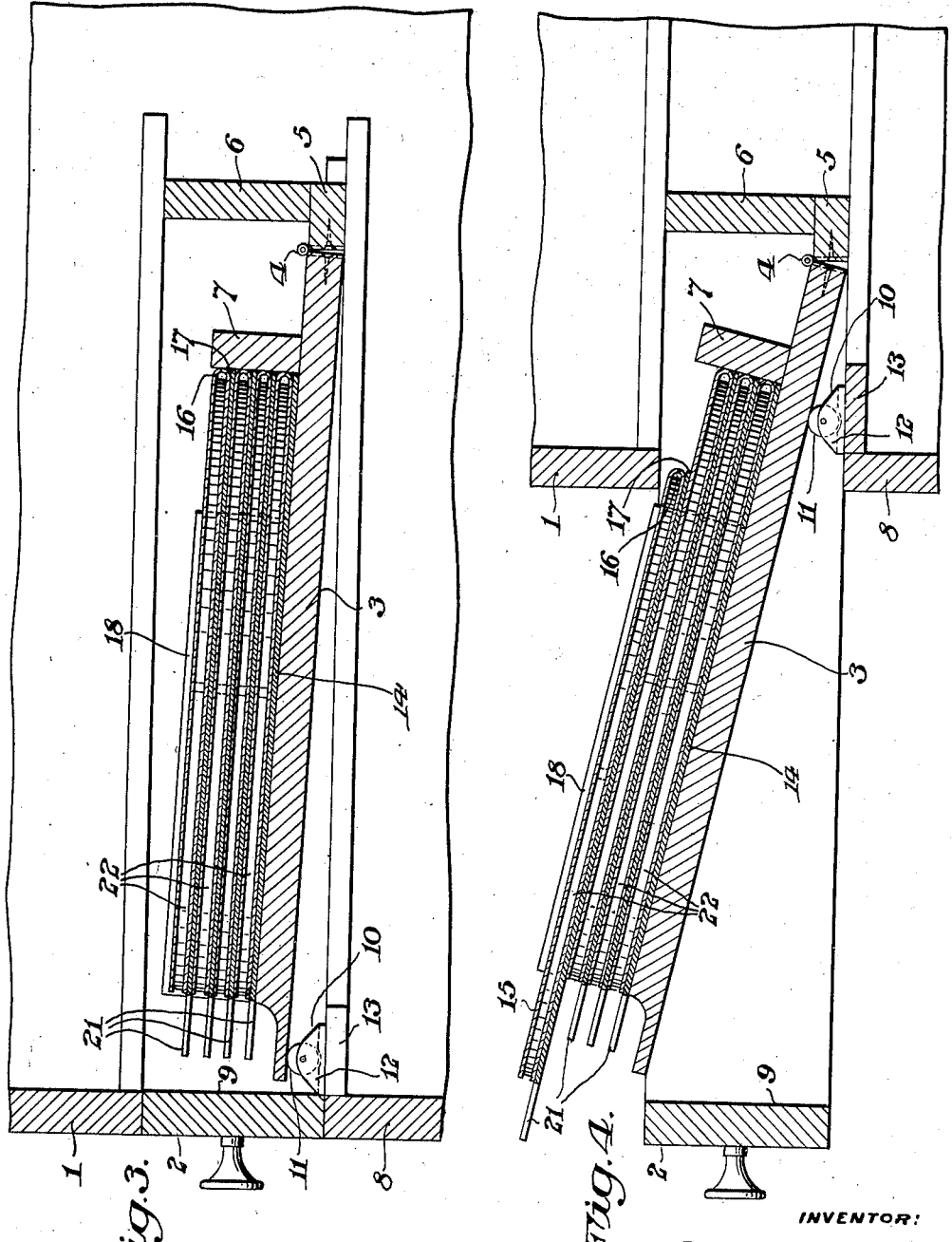

UNITED STATES PATENT OFFICE.

GEORGE JOHN LOOS, OF PHILADELPHIA, PENNSYLVANIA.

CABINET.

1,368,515.

Specification of Letters Patent.   Patented Feb. 15, 1921.

Application filed June 2, 1920. Serial No. 386,033.

*To all whom it may concern:*

Be it known that I, GEORGE JOHN LOOS, a citizen of Germany, but having declared my intention of becoming a citizen of the United States, and a resident of the city of Philadelphia, county of Philadelphia, State of Pennsylvania, have invented certain new and useful Improvements in Cabinets, of which the following is a specification, reference being had to the accompanying drawing.

The invention relates to a device for storing and filing records, files, letters and the like, and is preferably in the nature of a cabinet provided with drawers in which the records, files, letters, papers, sheet music, catalogues, pamphlets and similar matter are placed and which may be operated for a convenient access and withdrawal, as well as ready replacing and insertion of the contents thereof.

Among the objects of my invention is to provide a device of the character aforesaid comprising a cabinet provided with any suitable number of drawers in which are stored in indexed arrangement a number of objects, such as records and the like, as above indicated, in a convenient manner for ready access thereto.

Another object is to provide each drawer with means for automatically bringing or raising the contents of each drawer into convenient position for manual extraction from or insertion into their allotted place of the objects filed therein.

Another object of the invention is to provide means whereby a record, or the like, to which access is to be had, may be given a limited relative movement with reference to the rest of the records in a drawer so that it may project or extend from the rest of the contents of a drawer to render it convenient for its extraction from and insertion into place.

Other objects and advantages of my invention will more fully appear from the following specification and upon the accompanying drawing.

While I have herein disclosed one embodiment of my invention as applied to the storing, filing and indexing of talking machine records of the disk type, it is to be understood that this adaptation or use of the invention is not limited thereto but is for the purpose of illustration only and it is therefore to be understood that the invention has reference to the storing, filing and indexing of any other object of any nature susceptible to the use indicated without in any way limiting the invention to the particular use disclosed herein.

Reference is made to the drawing in which—

Fig. 3 is a transverse section taken longitudinally of a drawer, adjacent portions of the cabinet and the contents of said drawer;

Fig. 4 is a view similar to Fig. 3 with the drawer in open position and the contents thereof in raised and accessible position.

Figure 1:
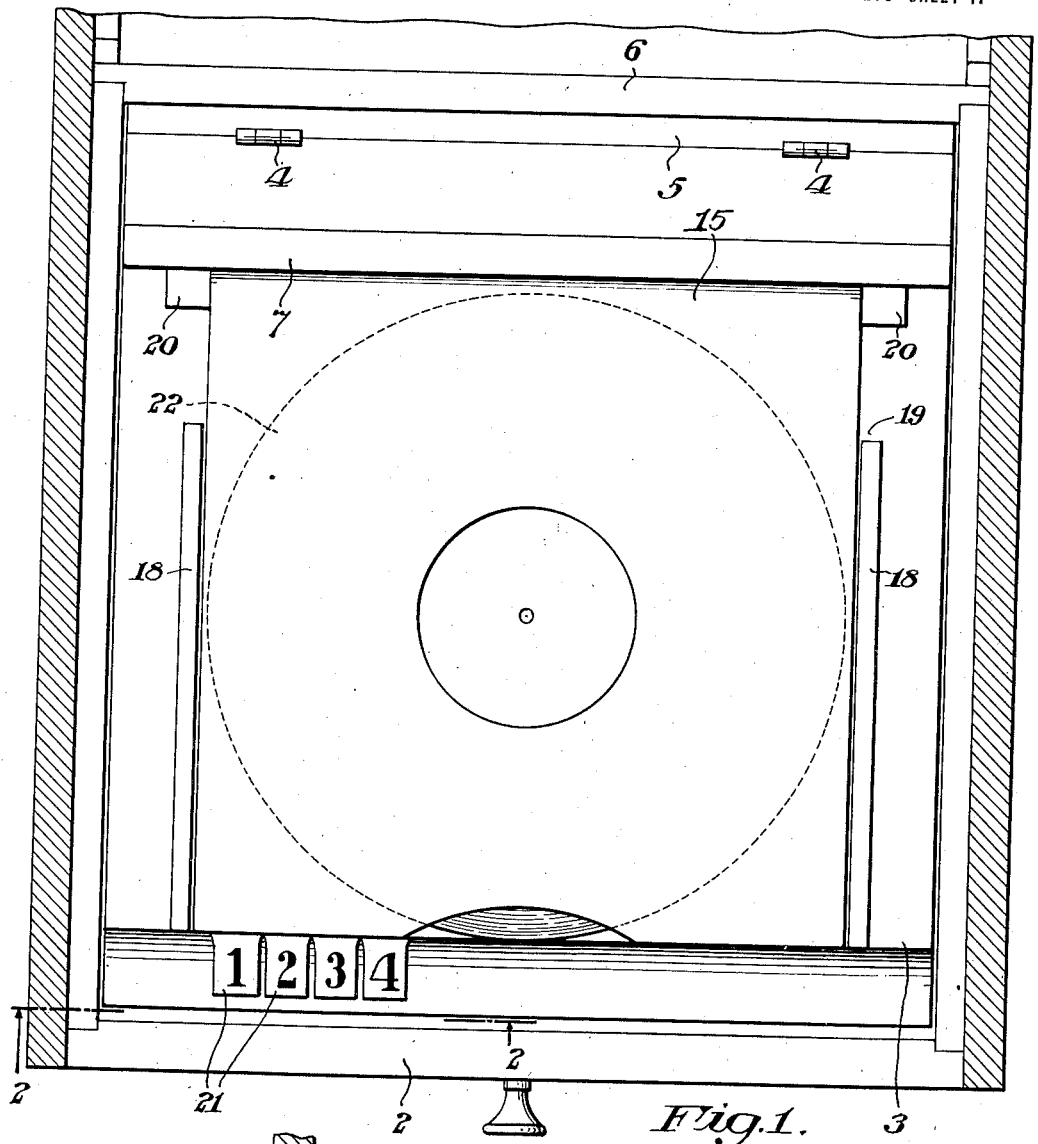
Figure 1 is a top plan view of a drawer of a cabinet with records in place, a part of the cabinet being shown in section.
Figure 2:
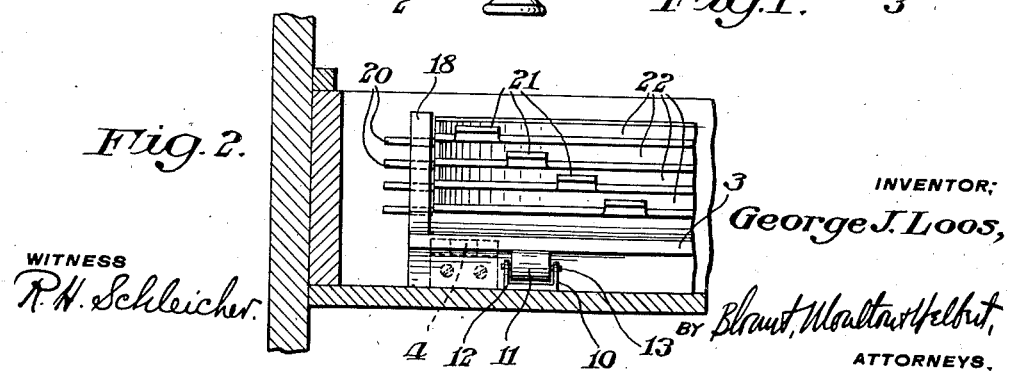
Fig. 2 is a fragmentary vertical section of the same taken on line 2—2 of Fig. 1.

Referring more particularly to the drawing upon which the same reference characters are used to designate corresponding parts in the several views, I have shown a cabinet 1 which may comprise a plurality of compartments in which are located drawers 2 capable of sliding to and fro within their respective compartments. Each drawer 2 is preferably substantially rectangular or square in form with a movable bottom 3 hinged at its rear end by a hinge 4 to a bottom section 5 permanently secured to a transverse rear wall 6 of the drawer. Near the rear end of the bottom 3 may be secured a transverse rear piece 7 against which the rear ends of the containers for the records may abut, as will more fully appear hereinafter.

In the particular embodiment of my invention shown in the drawing, I place within each compartment of the cabinet adjacent the front wall thereof a pair of supporting members 10 comprising rollers 11 mounted in the straps 12 which are suitably secured to a cross member 13, forming part of the cabinet. It will be understood that my invention is not restricted to this particular embodiment for it will be readily seen that other means than the rollers 11 could be employed and that but a single roller or other means could be adapted to the use of my invention.

The means for holding the records comprise an index card 14, of substantially rectangular form, as a base member upon which may be positioned an envelop 15 in which the record is usually contained and sold. I prefer, however, to slit the sides of the envelop in order that the same may be open at three sides thereof but closed at the fourth side, the latter remaining uncut. This uncut portion 16 of the envelop I prefer to secure to the rear portion 17 of the base card 14 by any suitable means or medium, such as an adhesive, whereby the envelop and the base card may be permanently retained together. At each side of a stack of base cards and envelops I provide strips 18, preferably of wood, rigidly secured to the bottom 3 and located closely adjacent to the edges of the cards 14 and the envelops 15. The members 18 are of a length to provide a space between the rear end 19 thereof and the rear piece 7. Each base card 14 is provided at the rear portion thereof with laterally extending integral portions 20 disposed behind and in spaced relation to the rear end 19 of the members 18. Each base card is provided with a tab 21 positioned in staggered relation to the tabs on the other base cards of the same stack, such tabs being provided preferably at the forward end of the cards 14. In each envelop 15 may be located a record 22 of the usual disk form, the same being inserted or withdrawn between the leaves of the envelop as in the usual manner.

In operation, assuming the cabinet to be closed and with records therein, when it is desired to attain access to any particular record, the user may withdraw or open a drawer 2 in the usual manner. In doing so the bottom 3 which rests at its forward end upon roller 11, will be caused to move forwardly relative to said roller and it will be apparent that the bottom 3 will be caused to gradually rise from the position shown in Fig. 3 to that shown in Fig. 4, thereby bringing the contents of the drawer, supported upon the bottom 3, into convenient position for access thereto. After the contents of the drawer have been raised to the position indicated, any particular record may be readily and selectively withdrawn from the stack by grasping the tab carrying the number corresponding to the record desired and drawing the base card thereof forwardly. For the purpose of illustration reference is made to Fig. 4 in which the upper base card, envelop and record have been withdrawn to the position above mentioned. The base card, however, cannot be wholly withdrawn but will move forwardly only to the extent where the projections 20 contact with the ends 19 of the members 18. The record itself then may be withdrawn from the envelop portions, used, and replaced therebetween. The base card then may be moved backward into the stack, with the rear edge thereof in contact with the back member 7. The drawer then may be closed, during which action the bottom 3 will automatically be lowered over the rollers 11 to finally reach the position shown in Fig. 3 of the drawing.

While I have herein described and shown upon the drawing one form or embodiment of my invention, it is to be understood, however, that the same is not to be limited to the particular details and arrangement of parts disclosed but comprehends other forms and arrangements of parts as do not depart from the spirit of the invention and the scope of the appended claims.

Having thus described my invention, I claim and desire to protect by Letters Patent of the United States:

1. In cabinets for storing and filing articles, the combination of a drawer, an angularly movable bottom in said drawer, a roller in said cabinet beneath said bottom adapted to support said bottom, said roller operative upon the movement of said drawer and bottom relative to said roller to move said bottom in an upward direction.

2. In a cabinet, the combination of a drawer provided with a movable bottom and rotatable means carried by the cabinet and in engagement with said bottom for automatically raising said bottom as the drawer is withdrawn.

3. In cabinets for storing and filing articles, the combination of a drawer adapted to be moved into and out of a drawer compartment in said cabinet, a movable bottom in said drawer and rollers in said drawer compartment in engagement with said bottom for automatically raising said bottom upon the movement of said drawer out of the drawer compartment.

4. In cabinets for storing and filing articles, the combination of a drawer, an angularly movable bottom in said drawer hinged to said drawer at the rear end thereof and a roller in said cabinet beneath said bottom to support said bottom and operative to automatically raise the forward end of said bottom upon the forward movement of said drawer and bottom relative to said roller.

5. A cabinet for storing and filing articles, comprising a plurality of drawer compartments, a drawer slidable in each of said compartments, each drawer provided with a hinged bottom, and a roller in each of said compartments adjacent the front portion thereof and located beneath the forward end of said bottom, said roller being adapted to automatically raise the forward end of said bottom upon the forward movement of said drawer and said bottom relative to said roller.

6. In a cabinet, the combination of a drawer provided with a movable bottom and means carried by the cabinet adapted to automatically elevate said bottom upon the opening of the drawer.

In witness whereof I have hereunto set my hand this 28th day of May, A. D. 1920.

GEORGE JOHN LOOS.